Jan. 16, 1934.    O. H. TRUMAN    1,943,850
MAGNETOMETER
Filed Jan. 22, 1929
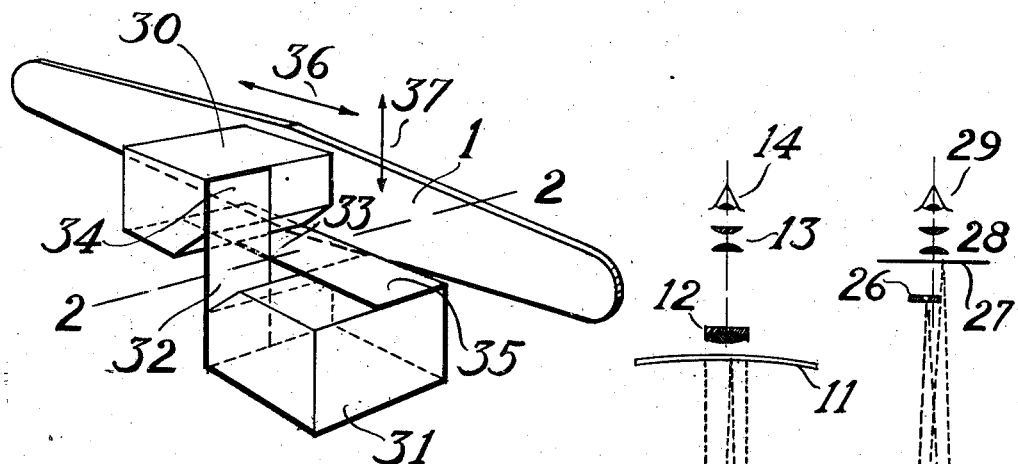
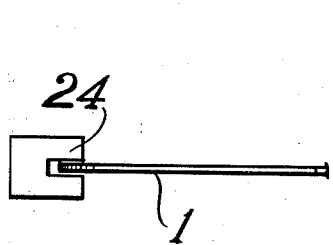
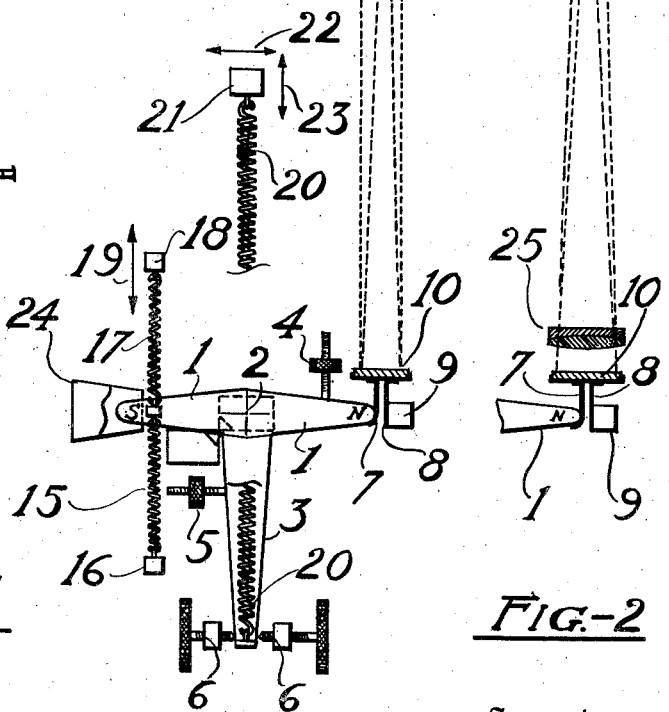

Patented Jan. 16, 1934

1,943,850

UNITED STATES PATENT OFFICE

1,943,850

MAGNETOMETER

Orley H. Truman, Houston, Tex., assignor to Standard Oil Development Company, a corporation of Delaware Application January 22, 1929. Serial No. 334,339

14 Claims. (Cl. 175—183)

This invention relates to improvements in instruments for measuring small variations in magnetic fields. It is primarily intended for use in connection with the geophysical exploration method described and claimed in my United States patent application, Serial No. 334,340, filed January 22, 1929. However, the instrument may be used with advantage wherever differences in a changing magnetic field are to be measured, so long as the changes do not take place too rapidly or too slowly.

The invention will be fully understood from the following description, in connection with the accompanying drawing, in which Fig. 1 is a diagrammatic side elevation of the instrument;

Fig. 2 shows an alternative form of reading device;

Fig. 3 is a detail plan view of damping means; and

Fig. 4 is a detail perspective view of a preferred means for mounting the magnet system.

Referring to the drawing, 1 denotes a magnet system, which may be a magnetized bar, or, if desired, two or more bars, mounted so as to act as one. The magnetized bar is supported on an elastic suspension, preferably the type commonly called a Cardan, or its equivalent, at 2, so as to turn in the plane of the paper about an axis perpendicular thereto. To the magnetized bar is fastened an arm 3. Upon the magnet or attached parts are mounted two adjustable weights 4 and 5, which can be so set as to bring the center of gravity of the whole moving system into the axis 2. Stop screws 6—6 limit the rotation of the moving system to a very slight motion.

To the moving system, in this case at the right end of the magnets, is elastically connected a mirror 10, which is also elastically connected to a fixed block 9, in such a way as to greatly amplify the angular motion of the magnet.

A preferable arrangement for this is two thin flat springs 7 and 8, shown edgewise in the figure, both of which are attached to the mirror at their upper ends. Spring 7 has its lower end attached to magnet 1, and 8 has its lower end attached to fixed block 9. It is now evident that as the magnet rotates about axis 2, its angular rotation is multiplied in mirror 10 as many times over as the distance from spring 7 to axis 2 is greater than that from spring 7 to spring 8. As this ratio can be easily made very large, a great amplification of the angular motion results.

A scale 11, reflected in mirror 10, is viewed thru the objective 12 and ocular 13 by the eye at 14. It is evident that by this arrangement a very small angular motion of magnet 1 may be measured.

To one end of the suspended system is attached the ends of a pair of springs 15 and 17. The other end of 15 is attached to the fixed block 16; the other end of 17, to the block 18, which is adjustable up and down, in direction of arrow 19, by any of the well known means.

To the end of the arm 3 is attached one end of a spring 20. The other end is attached to a support 21, which can be adjusted, by any of the well known means, in the direction of arrow 22 or arrow 23.

Support 21, axis 2, and attachment of spring to arm 3 will for this instrument preferably be nearly in the same straight line, tho this is not essenial.

All these springs will be so set as to give the suspended system a period about axis 2. To bring it to rest, some means of damping is desirable. A preferable form is shown at 24 in Fig. 1, and, in top view, at 24 in Fig. 3. It is a block of copper or other good conductor, with a slot in it, in which works the end 1 of the magnet. The eddy currents produced in the block, as the magnet moves, serve to damp out the vibration. These damping blocks may be provided at both ends of the magnet or magnets, if desired.

The details of the Cardan suspension may be seen in Figure 4. In that figure 30 and 31 are two blocks, of which one, 31, say, is attached to a fixed support, and the other one, 30, is attached to the moving magnet system. Two thin flat springs, 32 and 33, are attached to the blocks. Only two of the points of attachment, 34 and 35, can be seen in the figure; but the location of the other two can be easily inferred. The attachment may be by solder, screws, or otherwise. Two such systems as this would commonly be provided, one on either side of the magnet system.

It is now apparent that the magnet system is prevented from moving in the direction of the arrows 36 and 37 by the springs 33 and 32 respectively, but can rotate about axis 2—2, while block 31 remains fixed.

An alternative means of reading is shown in Fig. 2. Springs 7 and 8, block 9, and mirror 10 are as before. But a lens 25 causes an image of an illuminated slit 26 to be formed in the focal plane 27 of an ocular 28. The image is viewed by the eye at 29. A fine transparent scale is placed at 27, by which the deflections of the image are read.

The whole apparatus is enclosed in a suitable housing, not shown. The housing of the instrument should be constructed of thick metal walls, surrounded by heat insulating material, in the well known way, so as to keep all working parts as nearly as possible at a uniform temperature. At a convenient place there may be levels, to set the instrument level, and leveling screws, if desired, in the conventional way.

All this now being arranged as above, it can be shown mathematically and experimentally that 1. Adjustment of block 18 in direction of arrow 19 determines the position of equilibrium of the moving system. By proper setting this position may be caused to be between the two stops 6—6.

2. Adjustment of block 21 in direction of arrow 22 determines whether this equilibrium, if stable at all, shall be stable for a displacement in one direction only, or for a displacement in either direction. It will be so set as to make the equilibrium, if stable at all, stable for a displacement in either direction.

3. This condition being brought about, adjustment of block 21 in direction of arrow 23 determines the restoring force brought into action on displacement from equilibrium.

It is, therefore, apparent that by proper use of all three adjustments, the instrument can be caused to have a position of stable equilibrium between the stops, and its period of oscillation about that position may, within limits, be made long or short.

Now, if the apparatus is at equilibrium in a magnetic field, and the amount of the field changes, there will be a change of moment on the magnets 1—1, depending on the power of the magnets and the amount of change of the field.

Let this change of moment be $m$, expressed in dyne $cm$.

Let I be the moment of inertia of suspended system about axis 2, in $gm\ cm^2$.

Let P be the period, in seconds.

Let $\theta$ be the angular deflection, in circular measure, due to change of moment $m$.

Then it can be easily shown that $$\theta = \frac{1}{(2\pi)^2} \frac{P^2}{I} \cdot m.$$

Hence to make $\theta$ as large as possible for a given $m$—to secure high sensitivity, in other words—I should be as small as possible, and P large.

I is largely fixed by the necessities of construction; but P may be adjusted, as stated above, to secure high sensitivity.

It is, therefore, apparent that by a combination of all the elements mentioned above i. e., 1. A large distance between scale 11 or scale 27 and mirror 10.

2. A large ratio of amplification of angular displacement between magnet 1—1 and mirror 10.

3. A long period the device can be made very sensitive. At the same time, having no knife edges or other elements which introduce solid friction, it will read small forces nearly as accurately as large.

The form of instrument shown above is adapted for reading changes in the vertical component of magnetism. If the axis of the magnet 1 is placed vertical, the instrument will be suitable for reading changes in horizontal component. In general, the instrument reads changes in that component which is perpendicular to the axis of the magnet 1 and to the axis of rotation 2; and for special purposes could be adapted to read the component in any direction.

Commonly, however, two kinds of instrument only will be used, one for vertical, the other for horizontal, component. The latter will be set with its axis north and south, to read the E—W component, and then with its axis E—W, to read the N—S component. These, with the vertical component, will give the total change of field, both in direction and magnitude.

This form of instrument is primarily intended to measure with great accuracy, quick changes of magnetism, at a given point, such as occur in my underground exploration method referred to above (process which I am making the subject of a separate application). By proper change in the proportions of the springs, however, it might be given such stability, with less sensitivity, as to fit it to measure changes of magnetism occurring more slowly, as by natural causes, or from point to point, as well as from time to time, similar to the use of the Schmidt and other present forms of magnetometer.

The instrument may have the parts arranged in many ways, and constructed in many forms, different from the one shown. Thus for the two springs 15 and 17, one could on occasion be substituted; the spring or springs could be flat, rather than helical; and many other changes will occur to those skilled in the art of instrument design, which constitute no departure from the essentials of the invention, but are included within the scope of the appended claims.

I claim:

1. In a magnetometer, the combination of a magnet system, a Cardan suspension therefor, weights mounted on the magnet system, springs connected to the weights, and means for adjusting the weights and springs to place the magnet system in operative position.

2. In a magnetometer, the combination of a magnet system, a Cardan suspension therefor, means for adjusting the equilibrium position of the magnet system, means for limiting the period of the magnet system, and means for securing an amplified indication of any change from the equilibrium position.

3. The combination, in a magnetometer, of a magnet or magnets mounted on an elastic support, means for adjusting the equilibrium position on this support, means for causing the equilibrium to be stable on both sides of this position, means for altering the restoring force so as to vary the period of vibration about this position, means for damping this vibration, a mirror elastically connected to the magnet or magnets so as to amplify the extent of angular motion, and means for reading the deflection of the mirror, substantially as described.

4. In a magnetometer, the combination of a magnet system, a Cardan suspension therefor, means for adjusting the equilibrium position of the magnet system, means for limiting the period of the magnet system, means for damping vibration of the system, and means for securing an indication of any change from the equilibrium position.

5. The combination in a magnetometer, of a magnet or magnets mounted on an elastic support, means for adjusting the equilibrium position of the magnet on this support, means for causing the equilibrium to be stable on both sides of this position, means for altering the restoring force so as to vary the period of vibration about this position, and means for securing an indication of any change from the equilibrium position.

6. In a magnetometer, a Cardan suspension, a magnet system including a magnetized bar supported at an intermediate portion by the suspension for pivotal movement around a given axis, means associated with the magnet system laterally of the axis for determining the position of equilibrium of the magnet system, means exerting a pull upon the magnet system transversely of the axis for restoring the equilibrium position, and means for securing an indication of any change from the equilibrium position.

7. In a magnetometer, a Cardan suspension, a magnet system incuding a magnetized bar supported at an intermediate portion by the suspension for pivotal movement around a given axis, means associated with the magnet system laterally of the axis for determining the position of equilibrium of the magnet system, means exerting a pull upon the magnet system transversely of the axis for restoring the equilibrium position, means for damping vibration of the system, and means for securing an indication of any change from the equilibrium position.

8. In a magnetometer, a Cardan suspension, a magnet system including a magnetized bar supported at an intermediate portion by the suspension for pivotal movement around a given axis, and an arm depending from the intermediate portion of the bar, means associated with the magnet system laterally of the axis for determining the position of equilibrium of the magnet system, means exerting a pull upon the magnet system transversely of the axis for maintaining the equilibrium stable for displacement in either direction, and means for securing an indication of any change from the equilibrium position.

9. In a magnetometer, a Cardan suspension, a magnet system including a magnetized bar supported at an intermediate portion by the suspension for pivotal movement around a given axis, and an arm depending from the intermediate portion of the bar, means associated with the magnet system laterally of the axis for determining the position of equilibrium of the magnet system, means exerting a pull upon the magnet system transversely of the axis for restoring the equilibrium position, the means maintaining the equilibrium stable for displacement in either direction, and means for securing an indication of any change from the equilibrium position.

10. In a magnetometer, a Cardan suspension, a magnet system including a magnetized bar supported at an intermediate portion by the suspension for pivotal movement around a given axis, resilient means associated with the magnet system laterally of the axis for determining the position of equilibrium of the magnet system, resilient means exerting a pull upon the magnet system transversely of the axis for restoring the equilibrium position, and means for securing an indication of any change from the equilibrium position.

11. In a magnetometer, a Cardan suspension, a magnet system including a magnetized bar supported at an intermediate position by the suspension for pivotal movement around a given axis, a coil spring stretched between supports, the spring being secured at an intermediate portion to the magnet system laterally of the axis whereby the position of equilibrium of the magnet system is determined, means exerting a pull upon the magnet system transversely of the axis for restoring the equilibrium position, and means for securing an indication of any change from the equilibrium position.

12. In a magnetometer, a Cardan suspension, a magnet system including a magnetized bar supported at an intermediate portion by the suspension for pivotal movement around a given axis, and an arm depending from the intermediate portion of the bar, means associated with the magnet system laterally of the axis for determining the position of equilibrium of the magnet system, a coil spring stretched between the arm and a support transversely of the axis for restoring the equilibrium position, and means for securing an indication of any change from the equilibrium position.

13. In a magnetometer, a Cardan suspension, a magnet system including a magnetized bar supported at an intermediate portion by the suspension for pivotal movement around a given axis, and an arm depending from the intermediate portion of the bar, means associated with the magnet system laterally of the axis for determining the position of equilibrium of the magnet system, a coil spring stretched between the arm and a support transversely of the axis for maintaining the equilibrium stable for displacement in either direction, and means for securing an indication of any change from the equilibrium position.

14. In a magnetometer, a Cardan suspension, a magnet system including a magnetized bar supported at an intermediate portion by the suspension for pivotal movement around a given axis, and an arm depending from an intermediate portion of the bar, a coil spring stretched between supports at an angle to the axis, the spring being secured at an intermediate portion to the magnet system laterally of the axis whereby the position of equilibrium of the magnet system is determined, a second coil spring stretched between the arm and a support transversely of the axis for restoring the equilibrium position, the second coil spring maintaining the equilibrium stable for displacement in either direction and means for securing an indication of any change from the equilibrium position.

ORLEY H. TRUMAN.